Jan. 17, 1950     J. F. MURPHY     2,494,574
COUPLING DEVICE
Filed June 2, 1947
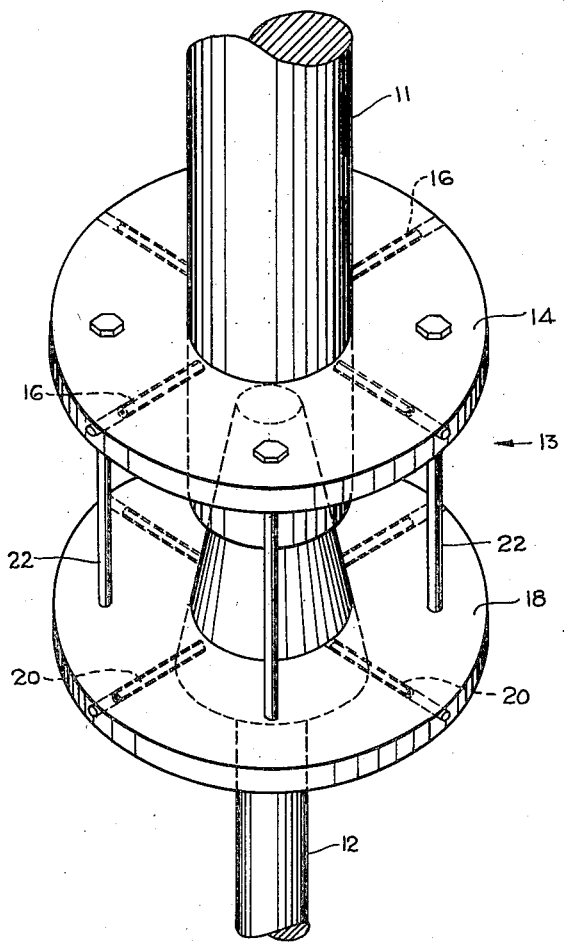
*INVENTOR.*
JAMES F. MURPHY.
BY *M. A. Hayes*
ATTORNEY Patented Jan. 17, 1950

2,494,574

UNITED STATES PATENT OFFICE 2,494,574

COUPLING DEVICE

James F. Murphy, Philadelphia, Pa.

Application June 2, 1947, Serial No. 751,945

1 Claim. (Cl. 287—129)

(Granted under the act of March 3, 1883, as amended April 30, 1928; 370 O. G. 757)

This invention relates to coupling devices and in particular to a device for clamping a tapered shank machine tool in an arbor.

An object of this invention is to provide apparatus for maintaining a positive connection between a tapered shank on a heavy machine tool and an arbor fitting around this shank.

Further objects and advantages of this invention, as well as its construction, arrangement and operation, will be apparent from the following description and claim in connection with the accompanying drawing, in which the single figure is an isometric view of one embodiment of this invention as attached to an arbor and a tapered shank tool.

In the embodiment shown in the drawing, there is an arbor 11 that is held in a drill press and the drive shaft 12 of an automatic tapping machine having a tapered shank, arbor 11 and shank 12 being held together by a coupling generally designated 13. Coupling 13 comprises a circular ring 14 attached to arbor 11 by means of setscrews 16, another circular ring 18 attached to tapered shank 12 by means of set screws 20 and a plurality of bolts 22 to couple rings 14 and 18 together. Therefore, there is a positive connection between arbor 11 and shank 12 to prevent the tapping machine from dropping down with possible injury to the operator as might happen if tapered shank 12 was merely held in arbor 11 by a force fit.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

For coupling a machine tool having a tapered shank to a power driven arbor shaped to fit the tapered shank, two rings, one or more setscrews embodied in each ring to secure one ring to the arbor and the other ring to the tapered shank, and bolts coupling the rings to hold the tapered shank and arbor together, thereby suspending the machine tool from the arbor.

JAMES F. MURPHY.

REFERENCES CITED

The following references are of record in the file of this patent:

UNITED STATES PATENTS

| Number | Name | Date |
|---|---|---|
| 1,405,921 | Kipniss | Feb. 7, 1922 |
| 2,019,463 | Reid | Oct. 29, 1935 |